UNITED STATES PATENT OFFICE.

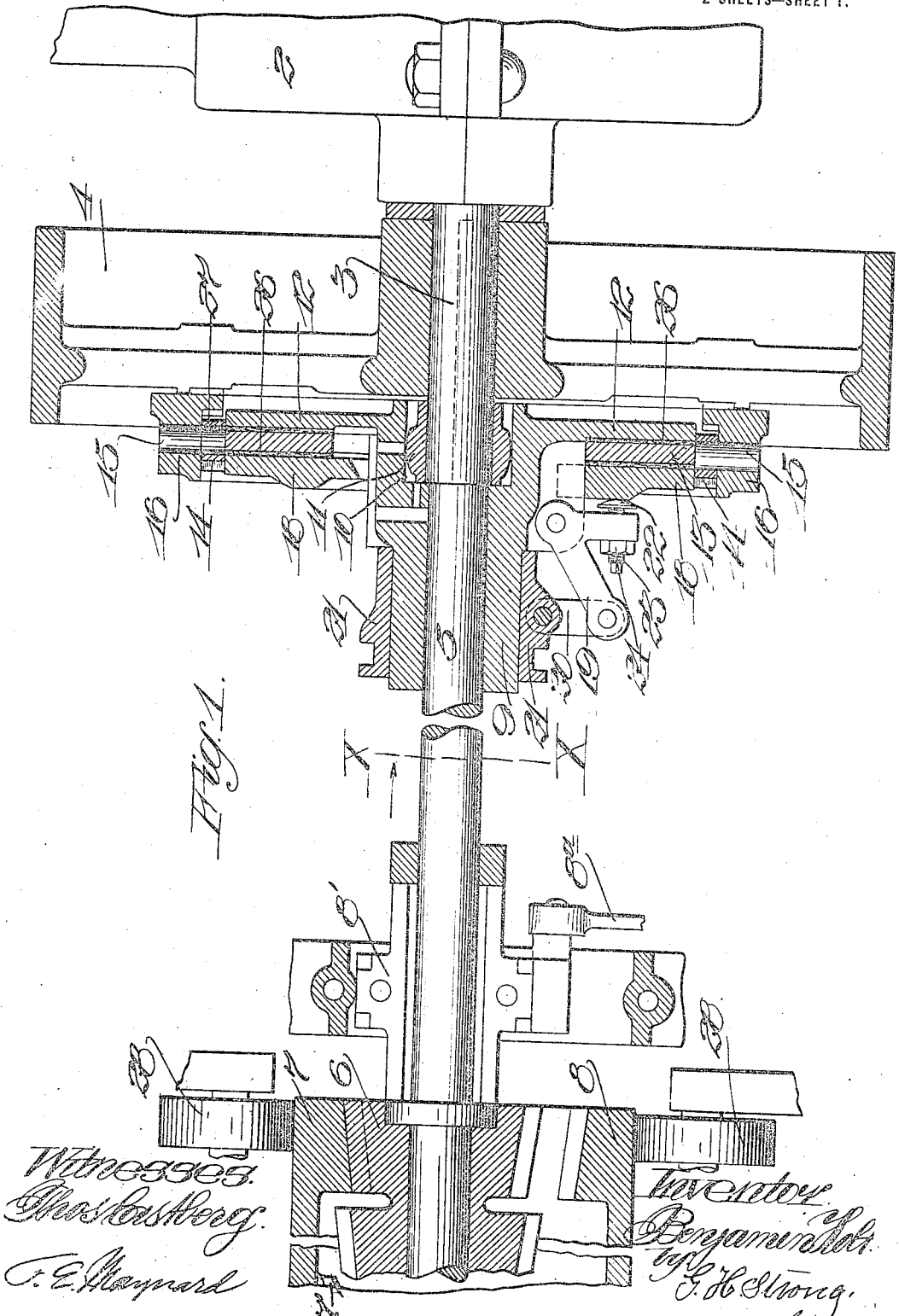

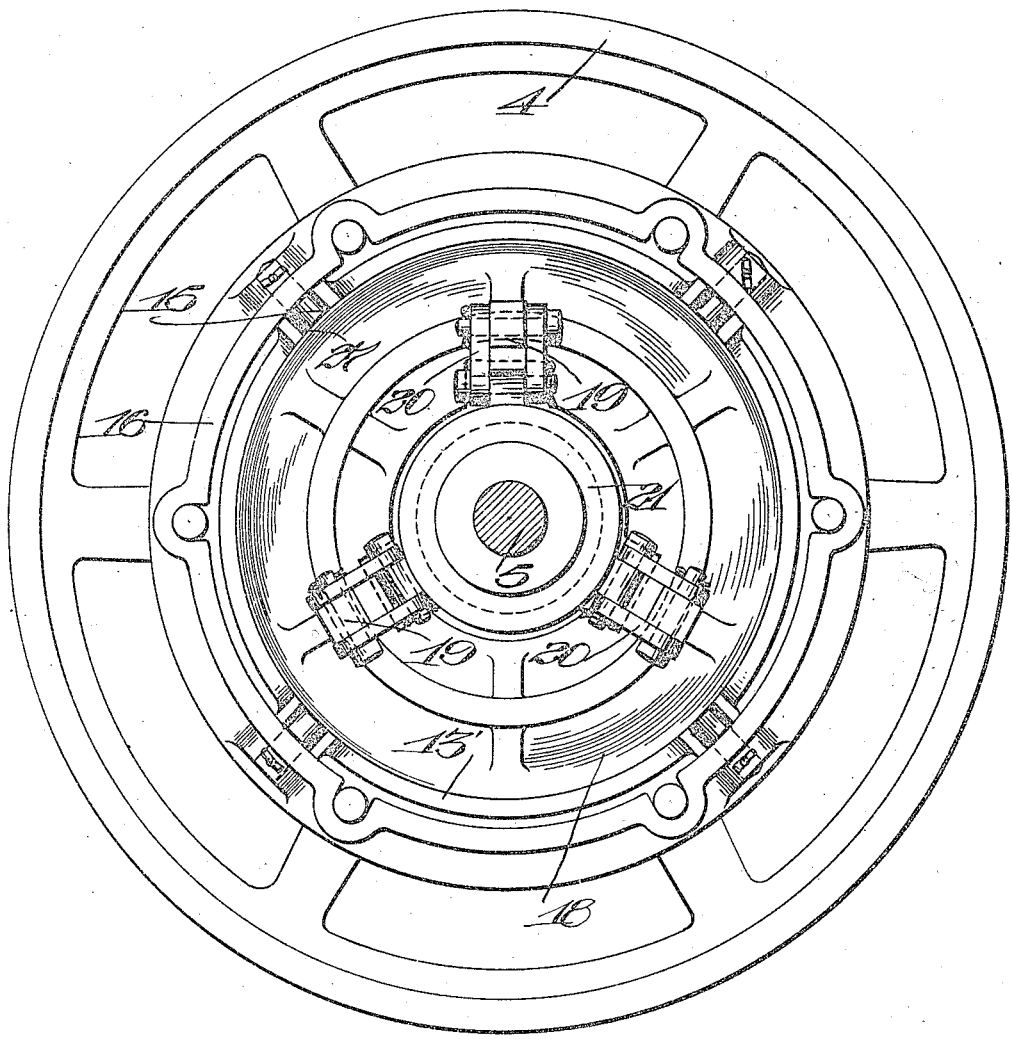

BENJAMIN HOLT, OF STOCKTON, CALIFORNIA.

CLUTCH DEVICE.

1,154,395.

Specification of Letters Patent.

Patented Sept. 21, 1915.

Application filed November 23, 1911. Serial No. 661,896.

*To all whom it may concern:*

Be it known that I, BENJAMIN HOLT, citizen of the United States, residing at Stockton, in the county of San Joaquin and State of California, have invented new and useful Improvements in Clutch Devices, of which the following is a specification.

This invention relates generally to improvements in clutch devices and pertains especially to a clutch device for use on traction engines and combined harvesters of the endless tread type, wherein flexibility and variable speeds combined with great strength are essentials.

In the construction of these so-called "caterpillar" engines where the tractive force is applied to the ground through one or more flexible endless traction belts, it is desired to place the engine at the forward end of the vehicle frame and to transmit the power back through a drive shaft to one or the other of a pair of opposed beveled gears from which the belt is driven to propel the engine, forward or back, by suitable connections.

The present invention relates particularly to the means for transmitting the power from the engine to one or the other of these beveled gears. These traction engines frequently haul loads of 50 tons or more over all sorts and conditions of roads and highways, and consequently the strains which the driving mechanism is subjected to are tremendous. While I mention this driving mechanism as especially designed for use on "caterpillars", it is manifestly applicable to other engines and conditions.

The invention consists of the parts and the construction and combination of parts as hereinafter more fully described and claimed, having reference to the accompanying drawings, in which—

Figure 1 is a longitudinal section of the transmission as adapted for operating in conjunction with an engine shaft and its fly-wheel. Fig. 2 is a cross sectional view on *x—x*, Fig. 1.

In the drawings I have illustrated an adaptation of the device showing in part, an engine 2 and its shaft 3, whereon is fixed a fly-wheel 4. 5 is a transmission shaft in approximate alinement with the shaft 3, and connectible and disconnectible at will with the shaft 3; its outer end being provided with a bevel pinion 6, engageable with one or the other of opposite bevel gears 7 and 8, when the shaft 5 is shifted sidewise by suitable means, as the sliding box 8' and lever 8ª.

The invention combines with the shafts 3—5, and gears, 6—7—8, a clutch mechanism and universal joint, of peculiar design, so constructed and arranged as to permit of the transmission of power from the engine 2 to the gears 7 and 8, and also to permit of the desired flexibility of shaft 5, so the gear 6 can engage with equal efficiency, either of the gears 7—8; also to provide a variable drive connection between the engine and the transmission shaft 5. To accomplish this, there is keyed on the shaft 5 a hub 9, recessed at 10, on one side to form a socket to fit over the ball-shaped bearing or sleeve 11, which is loose on the end of engine shaft 3. Formed upon or attached to the hub 9 is an annular plate or flange 12, having a smooth surface on one side against which may bear a friction ring 13. The ring 13 has a rim flange 13', which is slotted at suitable intervals (preferably 90° apart) as at 14, to receive the pins 15, which are on an annulus 16 appropriately connected to the wheel 4.

18 represents a complementary friction clutch ring loosely supported on and turnable with the hub 9. The ring 18 is adapted to be forced into frictional engagement with the disk 13 so as to jam the latter up against hub flange 13 by a set of toggle levers 19, connected by links 20 to a shiftable clutch collar 21. The toggle levers 19 are each provided with adjustable buttons 22 having threaded shanks 23 turnable in the lever 19 and locked by jam nuts 24. The levers 19 are fulcrumed in slotted portions of hub 9, and forming guides for the ring. When the collar 21 is shifted inward the buttons 22 contact with the ring 18 and this forces the disk 13 against the hub plate or flange 12.

In operation when the engine is running and the clutch sleeve 21 is moved out, the ring 13 will turn freely between the flange 12 and the ring 18. But when the sleeve 21 is shifted toward the clamp ring 18 the toggles 19 become effective to clamp the ring 13 between the plate 12 and ring 18, and shaft 5 will be driven by the engine. Varying the pressure on the ring 13 by shifting the clutch sleeve 21 will cause the shaft 5 to be driven at variable speeds.

The contiguous surfaces of the friction members 12—13—18 may be faced with fiber or equivalent, as indicated at 26. The introduction of the ball and socket bearing 10—11 and the rockable mounting of ring 13 on pins 15, provide a universal joint to allow of the necessary play and adjustment of parts, when the pinion 6 is shifted sidewise by the lever 8ᵃ, to engage one or the other of the gears 7—8.

The friction ring 13 is allowed to rock sufficiently by reason of the slots 14 in the rim flange 13′ being open on the side away from the fly-wheel 4. The pins 15 carry anti-friction roller sleeves or bushings 27 engaging the sides of the slots 14.

It is to be observed that the universal joint connection thus provided between the drive shaft and the driven shaft, lies substantially in the plane of the gripping members, 12—13—18; the joint connection lying within and constituting a part of the clutch mechanism since the rockable, sliding connection of the ring or friction member 13 upon the pins 15, is essentially a part of the clutch itself. The sliding connection of ring 13 on pins 15 allows it to coöperate properly with its complementary stationary member 12. The principle of the invention embodies this mounting of the friction ring upon the drive shaft or what is the same thing, the fly-wheel, so that this friction ring or member is capable of a limited universal rocking movement; and the coöperation with this rockable annular friction member of a pair of complementary friction members on the driven shaft, with means to cause these complementary gripping members to grip the friction member on the engine shaft. Manifestly, this clutch mechanism is capable of use in situations other than here shown, of a universal joint and drive shaft.

28 represents rollers journaled in the frame of the vehicle and disposed approximately in the plane of the pinion 6 and adapted to constantly run on and support the back of the respective gears 7—8, resisting the thrust due to the meshing of the gear 6 with the corresponding gears 7—8. These rollers 28 are found to be necessary by reason of the gears 7—8, and the tremendous strain and leverage to which they are subjected under working conditions.

When the machine is to be operated at various speeds, the pinion 6 is made with two beveled portions, the front one of which is normally in position to engage either of gears 7—8; the pinion being shiftable on the shaft 5 by a lever 29 to carry the rear beveled portion into and out of engagement with the high speed beveled gear 7′.

It will be seen from the foregoing that while the two shafts are connected at their proximate ends so that their axes may be inclined with relation to each other about a common center, the torque is transmitted from one shaft to another through a clutch mechanism having radial friction or clutching faces; one of the clutch members being mounted rigidly on one of the shafts and the complemental clutch member being connected to the other shaft by a connection which is in effect a universal joint which is arranged concentrically about a center common to the proximate ends of the two shafts. In other words, the clutch itself forms the effective driving universal joint connection between the shafts and the members of the clutch are supported in their proper relative position radially by the universal joint connecting the shafts and by which the proximate ends of the shafts are held against relative lateral displacement. By this construction the necessity for employing a clutch and a separate universal joint connection located at a different point longitudinally of the shaft from the clutch is entirely overcome and the construction is correspondingly simplified and strengthened for the driving connections of the universal joint are in the present arrangement located radially a very considerable distance from the axis of the shafts and there is, therefore, little or no danger of rupturing the same by any strain which can be transmitted through the clutch member.

Having thus described my invention, what I claim and desire to secure by Letters Patent is—

1. In a power transmission, the combination with abutting driving and driven shafts with their proximate ends supported one by the other against independent lateral displacement, said shafts being free to move into an inclined position with relation to each other about a center common to the proximate ends of the shafts sufficiently to permit one shaft to shift transmission of power to different gears, of a clutch embodying relatively movable clamping members fixed on one of said shafts to rotate in unison therewith and having radial friction faces, an annular clamped member having radial friction faces with which the faces on the clamping members coöperate, and a universal joint connection between the clamped member and the other one of said shafts, arranged concentrically about the center common to the proximate ends of the two shafts about which said shafts are free to change their relative angular position.

2. In a power transmission, the combination with driving and driven shafts having abutting proximate ends and a ball and socket connection between the shafts whereby the axis of one shaft may be inclined to the axis of the other sufficiently to permit one shaft to shift transmission of power to different gears and the shafts rotated independently, of a clutch embodying relatively movable clamping members fixed against angular movement on one of said shafts and having radial friction faces, an annular clamped member with which the clamping members coöperate, and a universal joint connection between the clamped member and other shaft arranged concentrically with relation to the ball and socket joint between the shaft and radially outside of the clutch member.

3. In a power transmission, the combination with driving and driven shafts, a ball and socket connection between the shafts whereby the proximate ends of the shafts are mutually supported against relative lateral movement, one shaft may be inclined with respect to the other sufficiently to permit said shaft to shift transmission of power to different gears and the shafts rotated independently, of a clutch embodying relatively movable clamping members on one shaft arranged concentrically with relation to the ball and socket connection and having radial friction faces, an annular clamped member located between and with which the clamping members coöperate, a ring rigidly connected with the other shaft and surrounding the clamping and clamped members, and a universal joint connection between said ring and clamped member whereby the clutch members when clamped together will move in unison with the shaft on which the clamping members are mounted when the angle of the shafts with relation to each other is changed.

4. In a power transmission, the combination with driving and driven shafts having abutting proximate ends mutually supported against independent lateral movement, whereby said shafts may be inclined with relation to each other sufficiently to permit one shaft to shift transmission of power to different gears and rotated independently, relatively movable clutch members mounted on one of said shafts to rotate in unison therewith, a ring mounted on the other of said shafts to rotate in unison therewith and surrounding the clutch members, an annular clamped member with which the clamping members coöperate having slot bearings in its peripheral portion arranged longitudinally of the shafts and projections on said ring extending into said slot bearings to form a universal joint connection between the clamped member and ring whereby the shafts may be inclined with relation to each other with the clutch members in either clamping position or with the clutch members free from each other to permit of the independent rotation of the shaft.

In testimony whereof I have hereunto set my hand in the presence of two subscribing witnesses.

BENJAMIN HOLT.

Witnesses:
H. G. BLACK,
O. H. ECCLESTON.